United States Patent [19]

Wetsel et al.

[11] Patent Number: 5,603,586

[45] Date of Patent: Feb. 18, 1997

[54] TWIST-LOCK MITER

[76] Inventors: John L. Wetsel, 6601 Monitor Rd., El Dorado, Calif. 95623; Stacy R. Wicks, 7622 Hardy La., Granite Bay, Calif. 95746

[21] Appl. No.: 521,183

[22] Filed: Aug. 30, 1995

[51] Int. Cl.$^6$ .............. E06B 3/96; F16B 12/26; F16B 7/22
[52] U.S. Cl. .......... 403/401; 403/382; 403/353; 403/298
[58] Field of Search .................. 403/401, 382, 403/353, 298, 292

[56] References Cited

U.S. PATENT DOCUMENTS

| | | | |
|---|---|---|---|
| 1,520,520 | 12/1924 | Thomason | 403/353 X |
| 1,534,468 | 4/1925 | Shea, Jr. | 403/382 |
| 3,269,068 | 8/1966 | King | 403/401 |
| 4,783,945 | 11/1988 | Heeg | 403/401 |
| 4,913,579 | 4/1990 | Campana | 403/401 X |

FOREIGN PATENT DOCUMENTS

| | | | |
|---|---|---|---|
| 2438348 | 6/1976 | Germany | 403/401 |
| 130489 | 12/1928 | Switzerland | 403/401 |

*Primary Examiner*—Anthony Knight
*Attorney, Agent, or Firm*—Harry G. Weissenberger, Inc.

[57] ABSTRACT

A miter is aligned and locked during assembly without the use of tools by engaging a dowel perpendicular to the faces of the mitered parts with a corresponding bore while the mitered parts are non-coplanar, and then twisting the parts about the dowel axis into a coplanar position in which they are interlocked by a key on one part cooperating with a recess on the other.

6 Claims, 5 Drawing Sheets

TWIST-LOCK MITER

FIELD OF THE INVENTION

This invention relates to a system for assembling miters in accurate alignment, and more particularly to a dowel-and-key system in which the parts of the miter are aligned and interlocked by a twisting motion without the use of tools.

BACKGROUND OF THE INVENTION

With the ever-increasing expansion of the do-it-yourself market into fields previously reserved for craftsmen, a need has arisen for mitered moldings such as window or door trim which can be rapidly and accurately assembled by unskilled persons without the use of tools.

Typically, a craftsman would construct, e.g., a window trim by placing mitered pieces of trim against each other, aligning them correctly, and then nailing them together. Although maintaining the alignment while nailing was not difficult for a skilled professional, it was a troublesome and often unsuccessful undertaking for an unskilled householder.

It has previously been proposed to solve this problem by the use of a key in the form of, e.g., a bow tie or some other shape cooperating with recesses in the mitered parts in such a way as to prevent relative movement of the parts in either the longitudinal or transverse directions of the key once the key was in place. However, in order for the prior art key to be effective, it was necessary to assure a tight fit between the key and the recesses. This in turn required the key to be hammered into place—an operation which, in unskilled hands, was likely to damage the typically wooden trim.

SUMMARY OF THE INVENTION

The invention overcomes the problems of the prior art by using mutually rotatable pivot elements such as a dowel and close-fitting bore to provide alignment in the direction transverse to the pivot axis of the rotatable element, and a key associated with one of the mitered parts which can be rotated into engagement with the other part to lock the parts against movement in the axial direction of the rotatable element.

In accordance with the invention, the mitered parts are assembled by juxtaposing the parts with one part twisted about 45°–90° with respect to the other part about the axis of the dowel, inserting the dowel into the bore, and then twisting the parts into a coplanar position.

It is thus the object of the invention to provide mitered moldings that can be assembled and locked in correct alignment by unskilled persons without the use of tools.

It is another object of the invention to provide a system for assembling and locking mitered molding parts by an inserting and twisting motion.

It is a further object of the invention to provide a system for assembling mitered molding parts in which the parts are first aligned by a rotatable element and then locked against separation by a rotatably engageable key.

DESCRIPTION OF THE PREFERRED EMBODIMENT

Figure 1:
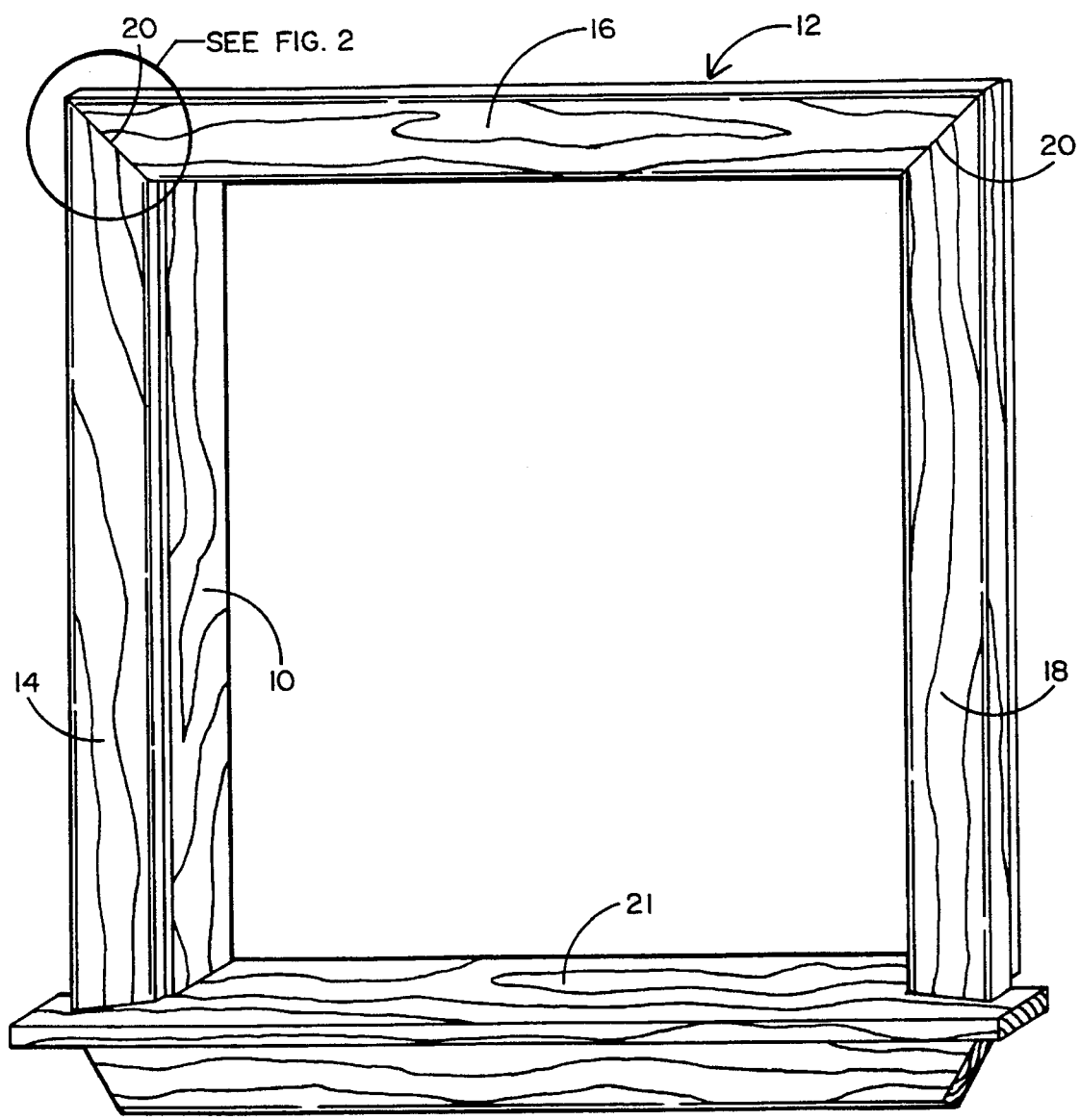
FIG. 1 is a perspective view of a window frame with a decorative trim assembled from mitered molding parts.

FIG. 1 shows a conventional window frame 10 with a decorative trim molding 12, made of wood or other suitable material, disposed on the inside thereof. The trim 12 is composed of three generally planar molding parts 14, 16 and 18 which are mitered at joints 20, typically, at a 45° angle. The resulting U-shaped trim 12 rests on the window sill 21.

The construction and assembly of the trim 12 is illustrated in FIGS. 2 through 8. Although these figures show the assembly of parts 14 and 16, it will be understood that the assembly of parts 16 and 18 is done in the same manner.

Figure 2:
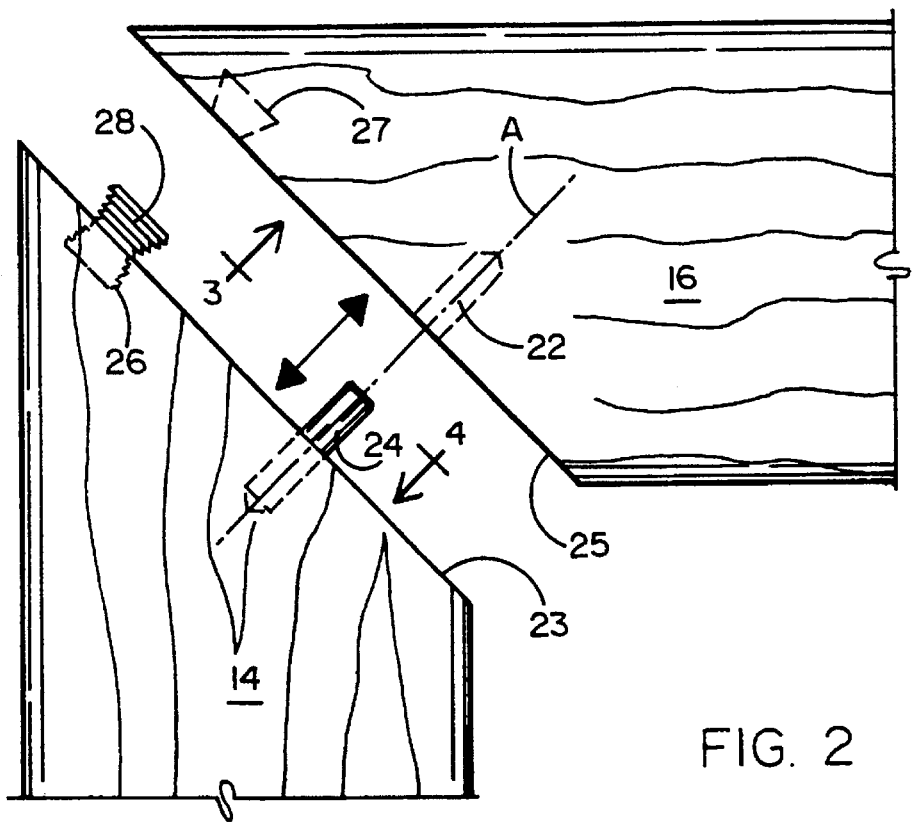
FIG. 2 is a front elevational view of two mating mitered molding parts constructed in accordance with the invention, prior to their assembly.
Figure 3:
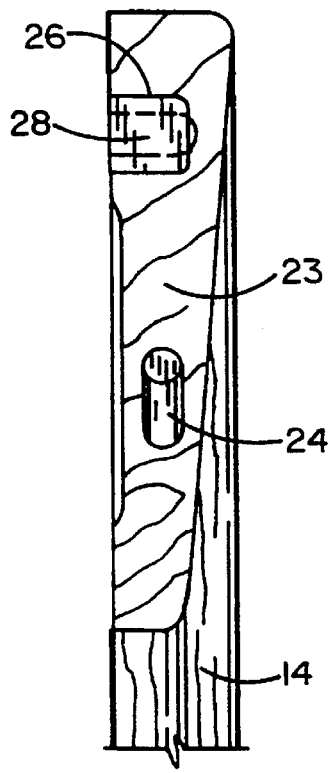
FIGS. 3 and 4 are side elevational views, respectively, of the two molding parts shown in FIG. 2.
Figure 4:
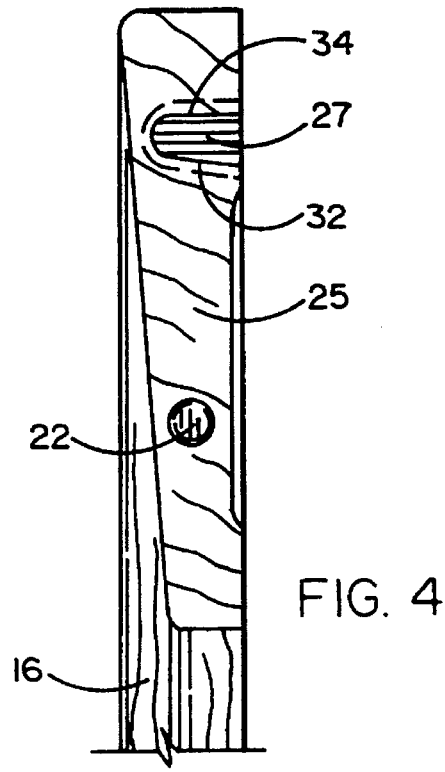

In the preferred embodiment of the invention, each of the miters 20 has a bore 22 formed in the miter face 23 of one of its parts, and a dowel or pin forming a pivot 24 in the miter face 25 of the other part (FIG. 2). Of course, both parts of the miter 20 may have bores 22 with the dowel or other pivot means 24 being a separate piece, without departing from the invention. The bore 22 and dowel 24 are perpendicular to the respective faces 23, 25.

The miter parts 14 and 16 also have formed therein, on their rear side, corresponding recesses 26 and 27, respectively, which preferably widen from the face 23 or 25 of the part toward the inside of the part. Although the shape shown in the figures is preferred, the invention encompasses any shape which will cooperate with a key in the manner discussed below.

Figure 10:
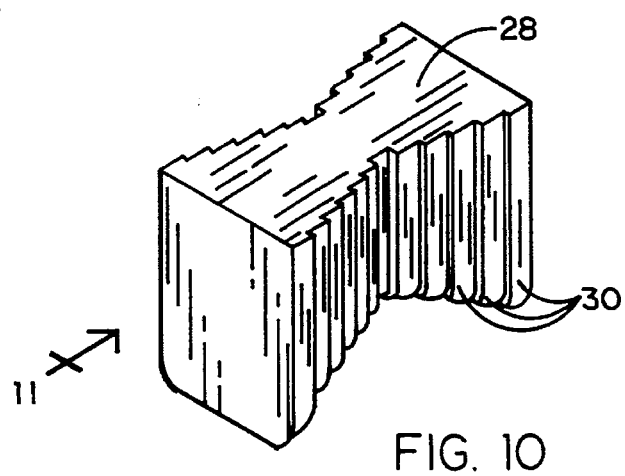
FIG. 10 is a perspective view of the key used in the invention.
Figure 11:
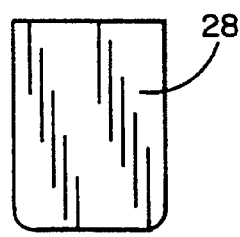
FIGS. 11 and 12 are end and side elevations, respectively, of a preferred type of key.
Figure 12:
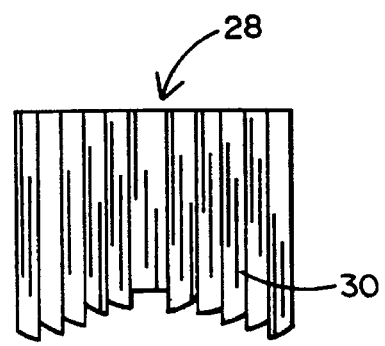

A key 28, which preferably has the bow tie shape shown in FIGS. 10–12, is inserted in the recess 26 in part 14. Placement of the key 28 may be done prior to assembly, with the key 28 being press-fitted into the part 14 or 16. Alternatively, the key 28 may be inserted into the part 14 or 16 as part of the assembly operation, by pressing it into the recess 26. The ridges 30 (FIG. 10) in the side of key 28 allow the key 28 to seat securely in the recess 26 with no more than finger pressure.

Figure 5:
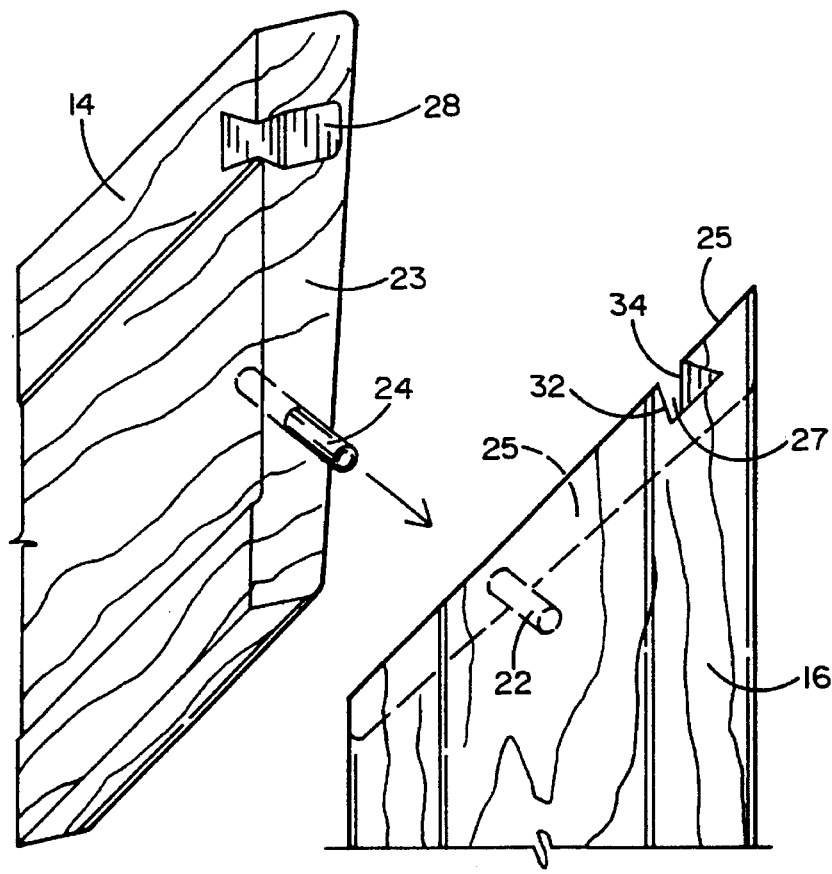
FIG. 5 is a perspective view of the parts of FIG. 2 prior to the insertion of the dowel into the bore.
Figure 6:
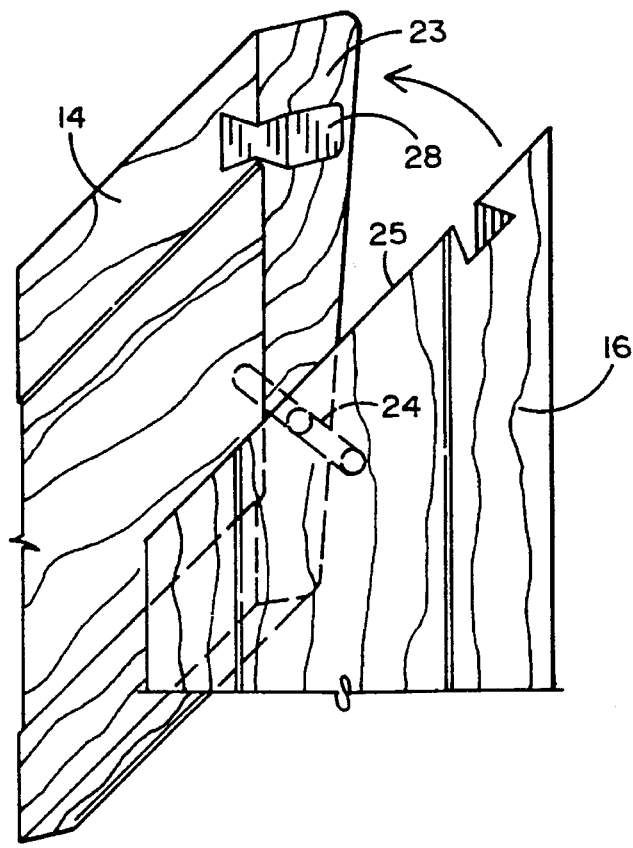
FIG. 6 is a perspective view of the parts of FIG. 2 after dowel insertion.
Figure 7:
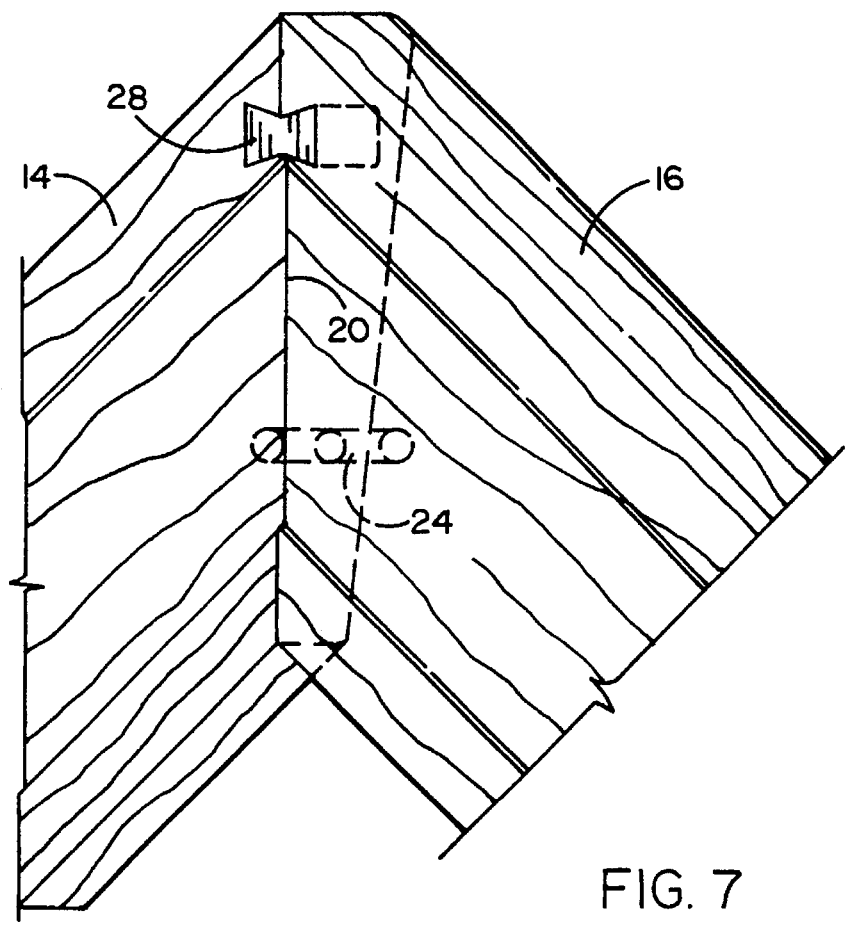
FIG. 7 is a perspective view similar to FIG. 6 but showing the position of the parts after locking.
Figure 8:
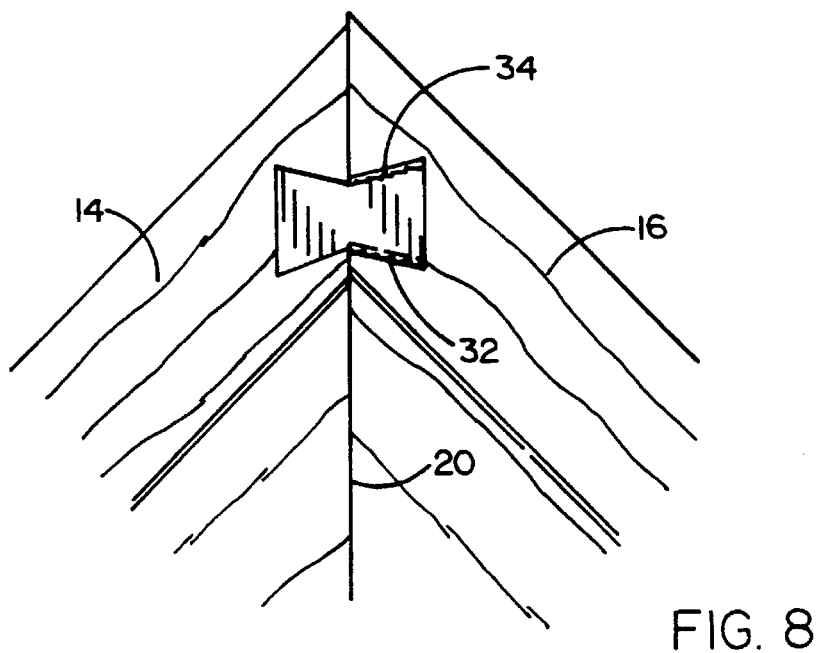
FIG. 8 is a fragmentary rear elevational view showing the parts just prior to locking.
Figure 9:
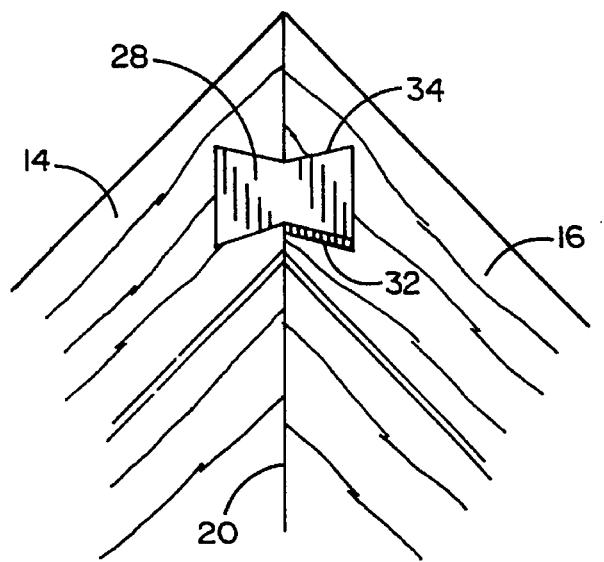
FIG. 9 is a view similar to FIG. 8 but showing the parts after locking.

In order to assemble part 14 with part 16, part 16 is rotated or twisted about the pivot axis A of the dowel 24 to a position where its plane is at about a 45°–90° angle to the plane of part 14 (FIG. 5). In that position, the dowel 24 is inserted into the bore 22 (FIG. 6) until the faces 23 and 25 abut against each other. The assembly of parts 14 and 16 is completed by rotating or twisting part 16 about the axis A until part 16 is coplanar with part 14 (FIG. 7). During this movement, the recess 27 in part 16 engages the key 28. It will be noted in FIG. 4 that the side 32 of recess 27 is not horizontal but slopes downward. The reason for this taper in a direction perpendicular to face 25 is that, during the twisting movement to lock the miter, the key 28 first engages the recess 27 loosely at an angle, and then gradually straightens and seats firmly in the bottom of recess 27. This is illustrated in FIGS. 8 and 9, which show engagement of the key 28 with side 32 of 27 when the key 28 first meets recess 27 (FIG. 8), and engagement with side 34 when the twisting movement is completed and the key 28 is fully seated (FIG. 9). This feature also assists in drawing the faces 23, 25 tightly together if they are not in close contact with each other.

The trim molding 12 can now be attached in any conventional manner to the sill 21 and/or the window frame 10. It will be understood that the miter system described herein with reference to window trim can equally well be used for molding on door frames, walls, or any other support adapted to use the trim molding 12. It is not normally necessary to secure parts 14 and 16 permanently together, as by nailing, but if desired this can be done to prevent part 16 from being rotated back out of engagement with part 14.

Although the invention has been described herein in terms of a 45° miter, the assembly system of this invention can equally well be used in other joints, e.g., when an end of one molding part is joined to the side of another at a 90° angle. Consequently, the invention should not be construed to be limited except by the scope of the following claims.

We claim:

1. A toolless assembly and locking system for a miter joint, comprising:
   a) first and second substantially planar parts to be joined at mitered faces;
   b) pivot means removably interconnecting said faces for relative rotational movement about the pivot axis of said pivot means, said pivot axis being perpendicular to said faces;
   c) a key and a recess formed in said face of said second part arranged to so engage said key as to lock said faces against relative transverse movement when said first and second parts are rotated about said pivot axis from a non-coplanar position to a coplanar position while said faces are substantially in contact with each other.

2. The system of claim 1, in which said pivot means is a dowel rotatable in a bore formed in at least one of said faces.

3. The system of claim 1, in which said recess in said second part is tapered in a direction perpendicular to said face of said second part so as to receive said key loosely and then seat it as said first and second parts are pivoted into a coplanar position.

4. The system of claim 1, in which said parts are elements of window trim.

5. The system of claim 1, in which said key is substantially bow tie shaped.

6. A toolless assembly and locking system for a miter joint, comprising:
   a) first and second substantially planar parts to be joined at mitered faces;
   b) pivot means removably interconnecting said faces for relative rotational movement about the pivot axis of said pivot means, said pivot axis being perpendicular to said faces;
   c) a bow tie shaped key and a recess formed in said face of said second part arranged to so engage said key as to lock said faces against relative transverse movement when said first and second parts are rotated about said pivot axis from a non-coplanar position to a coplanar position while said faces are substantially in contact with each other; and
   d) said recess in said second part being tapered in a direction perpendicular to said face of said second part so as to receive said key loosely and then seat it as said first and second parts are pivoted into a coplanar position.

* * * * *